Feb. 23, 1960 W. F. STAHL ET AL 2,925,624
METHOD OF UNITING TELESCOPED TUBES WITH A SWELLING AGENT
Filed Aug. 25, 1953
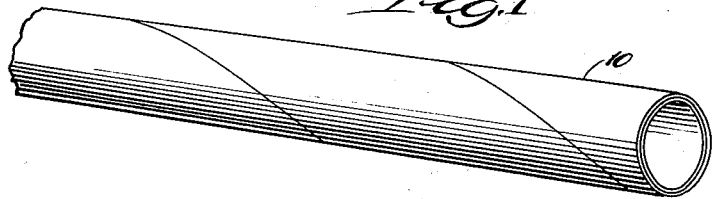
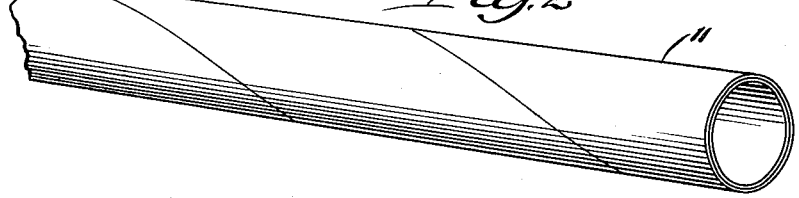
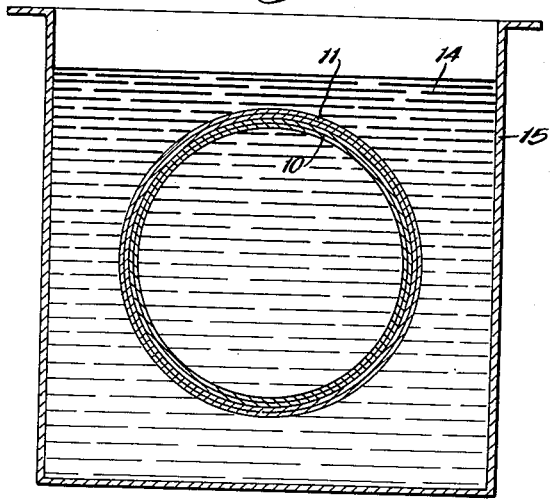
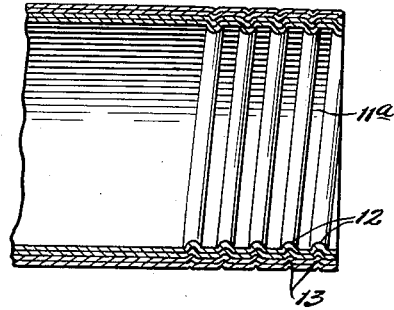
INVENTORS:
William F. Stahl and
Hugh T. Blair Jr.,
BY Dawson, Tilton & Graham,
ATTORNEYS.

United States Patent Office 2,925,624
Patented Feb. 23, 1960

2,925,624

METHOD OF UNITING TELESCOPED TUBES WITH A SWELLING AGENT

William F. Stahl, Kenilworth, and Hugh T. Blair, Jr., Chicago, Ill.

Application August 25, 1953, Serial No. 376,332

7 Claims. (Cl. 18—59)

This invention relates to tube structures and to a method of forming the tubes. In particular, the invention relates to tube structures having high mechanical strength and good electrical properties, especially high dielectric strength, and to a method of forming the same. The tubes are readily used in numerous applications and environments and by way of example, are ideally used in the electrical industry as coil forms, collars, bushings, spacers, shafts, etc.

Quite frequently there is a need for a tube structure having certain specialized features or characteristics combined with the requirement that it have high mechanical strength. While mechanical strength may be obtained by providing a tube of fibrous material, such as paper, and impregnating it with an impregnating varnish, such as a resin plastic (phenol formaldehyde, for example), such a tube may not have the requisite specialized characteristics. On the other hand, if the tube is formed from a material providing the desired special characteristics it may not provide the necessary mechanical strength.

A specific instance of this situation exists in the electrical field where it is often essential that a tube used for a coil form, spacer, etc., have both high mechanical strength and good electrical properties, such as high dielectric strength or insulating properties, moisture resistability, and non-corrosive properties. While several plastics readily provide the latter features, they have low tensile strength and while impregnated paper tubes are strong, they do not have the required electrical features. The result is that where these combined needs exist they are satisfied by using structures formed from expensive ceramics (ceramics must be handled carefully since they readily crack, chip, etc., and also form fairly bulky structures). As well as being expensive, ceramics are heavy and all in all considerably increase the cost of the equipment they form a part thereof.

Moreover, many tubes are used in the radio and television industry as RF and IF forms, and necessarily, these tubes have exceedingly light walls. It is exceedingly difficult to maintain a proper impregnating formulation for these light walls (especially so in the case of the 100% phenol impregnated tube) that will not be brittle and that will not have a tendency to shatter either under the pressure of the coil winding operation or under the punching or forming operations that are necessary in providing the finished product.

It is accordingly an object of this invention to provide an inexpensive tube structure and method of forming the same that has high mechanical strength combined with chosen specialized properties. Another object of the invention is in providing a tube structure and method of forming the same in which an inner tube structure having high mechanical strength is integrated with an outer tube structure having specialized characteristics, such as those hereinbefore set out, but that may not have in itself the necessary tensile strength to permit independent use. Another object of the invention is in providing an impregnated tube structure having a character similar to shatter-proof glass and that will not shatter when subjected to the pressure of a coil winding operation or under punching or forming operations even though the walls be exceedingly thin.

Still another object is in the provision of a tube structure and method of forming wherein a pair of telescoped tubes are provided; the inner tube having high mechanical strength and the outer tube having good electrical properties; and the outer tube being swollen to anchor it securely to the inner tube. Yet another object is in the provision of an inner impregnated paper tube and telescoped thereabout and anchored thereto an outer plastic tube or sheath, the combination providing a shatter-proof tube structure.

A further object of the invention is in providing an inner tube formed of impregnated laminated paper and an outer tube formed of plastic and in which the method of uniting the tubes includes immersing the tubes in a chemical bath that swells the plastic tube and thereby anchors it securely to the inner tube. Additional objects and advantages will appear as the specification proceeds.

Embodiments of our invention are illustrated in the accompanying drawing, in which—

Figure 1 is a broken perspective view showing the inner tube; Fig. 2 is a broken perspective view showing the outer tube; Fig. 3 is a broken perspective view showing the inner and outer tubes in telescoped relation; Fig. 4 is a transverse sectional view showing the telescoped tube structures immersed in a chemical bath; and Fig. 5 is a broken longitudinal sectional view showing a modification of the tube structure.

The tube illustrated in Fig. 1 forms the inner tube of the completed tube structure and is designated with the numeral 10. The tube 10 may be formed in any suitable mannner and may be made of any material that gives the desired properties. Preferably, we form a tube 10 on a tube winding machine employing a mandrel, etc., such as is well known in the art. The tube 10, when formed in such apparatus, is a laminated tube and comprises a plurality of layers wound one upon another. Preferably, the material used to form the tube is a fibrous material, such as paper, and the tube 10 then is a laminated paper tube.

After the laminated tube 10 is formed, we prefer to immerse it in a bath of impregnating material, such as any of the impregnating varnishes usually used for this purpose. Suitably, a resin plastic may be used and, for example, phenol formaldehyde provides a suitable impregnating material. The tube 10 then is preferably an impregnated laminated paper tube. It will be apparent that the resin impregnation provides high mechanical strength, and the impregnation is carried on for this particular reason.

The outer tube is illustrated in Fig. 2, and is designated with the numeral 11. The material from which the tube 11 is formed is chosen so as to have selected specialized properties such as, for example, good electrical properties. Specifically, if the tube is to be used in the electrical field for coil forms, etc., the material from which the tube 11 is formed preferably is non-corrosive, is highly resistant to condensation, and has good dielectric and insulating properties. For this purpose we prefer to use cellulose acetate, although numerous other plastics, such as thermoplastics, may readily be used. For example, ethyl cellulose, polystyrene and polyethylene have all been used successfully.

Preferably, the tube 11 is a laminated tube and is formed by winding several layers of the selected plastic material one upon another to provide the structure illustrated. This winding operation may be carried on in a tube-forming machine such as the one employed in winding the tube 10 and, if desired, the same apparatus may be employed for winding both of the tubes 10 and 11.

After the tubes 10 and 11 are formed, the tubes are telescoped with the inner tube 10 being inserted into the outer tube 11. It will be appreciated that to permit the telescoping step to be carried out, the outer diameter of the inner tube 10 must be slightly less than the inner diameter of the outer tube 11. Preferably, the diameters are selected so that the inner tube 10 is snugly received within the outer tube 11 but is readily inserted thereinto without excessive frictional resistance between the tubes.

If required, prior to the step in which the inner tube 10 is telescoped into the outer tube 11, the inner tube may be equipped with a plurality of threads 12, such as those illustrated in Fig. 5 on the tube 11a. Preferably, the threads 12 are formed by impressing a die upon the outer surface of the inner tube and the die is operative to force the tube portions engaged thereby inwardly to form indentations or recesses which define the threads 12. Later, when the outer tube is placed upon the inner tube and is treated with an appropriate swelling agent, the outer tube provides swollen zones which extend into the recesses and threadedly anchor the two tubes together. The threads 12 are particularly desirable where the final tube structure is to be used as a coil form and provides a means for adjusting the core of the coil. As is well known, a great number of coils used in the electrical industry must be provided with movable cores that are adjustable. It may be mentioned that the tube 10 is dimensionally accurate and the threads 12 are accurately formed in the inner tube. Therefore, a movable core subsequently threaded into the tube may be moved when a predetermined torque is applied thereto.

After the tubes 10 and 11 have been telescoped, we immerse the telescoped tubes in a chemical bath 14 provided in a tank 15. The bath 14 is operative to swell the outer plastic tube 11 and to thereby rigidly secure or unite it with the inner tube 10. It will be apparent that when the tube 11 swells when subjected to the bath 14, the outer diameter increases and at the same time the inner diameter decreases so that the tube 11 becomes firmly anchored to the inner tube 10.

When the outer tube 11 has been swollen within the bath 14 to provide a firm anchorage between the inner and outer tubes, the tube structure is withdrawn from the bath 14 and permitted to dry. If felt necessary, the tube structure may be heated in appropriate ovens to facilitate the drying of the tube structure. For example, the tube may be passed through an infra-red baking oven to dry the tube. After drying, it is found that the swelling has been permanent and the two tube structures are firmly and permanently united to form a unitary or integral tube.

The chemical composition of the treating bath 14 may take any desired form within wide limits. In general, the treating bath should comprise a moderate amount of swelling agent combined with substantially greater quantities of a solvent. While wide discretion in the choice of solvents and their proportions may be allowed, the composition employed will greatly influence the length of time required for the bath to effect the swelling and setting actions which are required to anchor the inner and outer tubes together.

Effective and rapid results can be obtained when the swelling agent is combined with a plurality of solvents having radically different time characteristics, that is to say, the solvents have different activity characteristics when applied individually to the plastic tube 11. Preferably, a relatively small quantity of a mild solvent combined with larger and substantially equal quantities of an active solvent and an extremely active solvent provide excellent results. The swelling agent, when cellulose acetate is employed for forming the outer tube 11, may be selected from among the ketones and, particularly, methyl isobutyl ketone has been found satisfactory.

Although not necessary in most cases, it may be helpful to add to the bath a small quantity of a plasticizer. This ingredient prevents the plastic tube 11 from becoming brittle and thus increases the ability of the tube structure to withstand mechanical abuses. Satisfactory plasticizers for this purpose are dibutyl phthalate and tri (2 chloroethyl) phosphate.

The following two examples of bath compositions have been found successful in practicing the method of our invention.

*Example I*

A bath was made up of 60 parts of tetrahydrofuran, an extremely active solvent for cellulos acetate, 50 parts of acetone, a somewhat less active solvent, and 20 parts of ethylene glycol monomethyl ether, a mild softening solvent, and 10 parts of methyl isobutyl ketone, the swelling agent. The ingredients were mixed thoroughly at room temperature and the bath was then ready for use. Excellent results were obtained with this bath and the outer tube 11 was quickly anchored permanently to the inner tube 10 after being subjected to the bath and by the swelling caused thereby.

*Example II*

A chemical bath for carrying out the invention was prepared by employing 64 parts of furfural, 40 parts of ethylene glycol monomethyl ether, and 40 parts of methyl isobutyl ketone. These ingredients were mixed thoroughly at room temperature and to the mixture was added 1 part of dibutyl phthalate. The resulting bath was employed at room temperature and it was found that immersion of the tubes into the bath for intervals of from 1 to 5 seconds effectively swelled the plastic tube 11 to bring about an achorage thereof to the inner tube 10.

After the tubes 10 and 11 have been rigidly united in the bath 14 and subsequently dried either in or out of a drying oven, the tubes may be ground to precise size if this is desired. For example, the tubes may be placed into a centerless grinder which is operative to remove a portion of the outer tube 11 and to provide an outer tube diameter having any specific dimensions required.

The tube structure is very suitable in that the inner tube 10 has high mechanical strength which is a desirable attribute in numerous applications and the outer tube 11 provides the specialized properties or characteristics that may be required in diversified applications. Yet the tubes are cheaply and easily made since forming laminated tubes in tube-forming apparatus is an inexpensive operation, while the paper employed in forming the laminated tube is an inexpensive raw material. At the same time, the outer tube 11 is relatively inexpensive, yet together the end product combines high mechanical strength with good specialized characteristics. It will be apparent that the inner and outer tubes 10 and 11 may be round, oval, square, rectangular, or have any other desired cross-sectional configurations.

The tube structure formed in accordance with this invention is found, surprisingly, to have non-shattering or shatter-proof characteristics. This is true even where the tube has exceedingly thin walls, as in tubes used for RF and IF coil forms. An impregnated paper tube formed in the usual manner and having relatively thin walls may be taken between the thumb and forefinger and pressure applied across a diameter thereof and it is found that the tube shatters into a number of pieces. This is undesirable, for such a transverse force is applied during a coil winding operation with, too frequently, the same result—namely, shattering of the tube.

In our tube, however, the tube does not shatter regardless of the magnitude of the transverse force applied thereto. If a sufficiently large force is applied, the tube will crack but does not shatter. Moreover, it is found that a force which is of sufficient magnitude to shatter a conventional impregnated tube is ineffective to crack the tube structure we provide.

While in the foregoing specification we have set out embodiments of the invention in great detail for purposes of illustration, it will be apparent that those skilled in the art may vary these details considerably without departing from the spirit and principles of the invention.

We claim:

1. In a method for uniting two members, at least one of which is formed of a plastic material capable of permanently swelling into a condition of increased volume upon treatment with an appropriate swelling agent, comprising the steps of providing an inner and an outer member, positioning said outer member upon said inner member, and treating the member formed of plastic with an agent capable of permanently swelling the same to anchor said inner and outer members securely together.

2. In a method for uniting an inner and an outer member without reducing the external dimensions of said outer member, said outer member being formed of a plastic material capable of permanently swelling into a condition if increased volume upon treatment with an appropriate swelling agent and said inner member having a recess in the peripheral surface thereof, the steps of positioning said outer member upon said inner member, and treating said outer member with an agent capable of permanently swelling the same, whereby, upon treatment with said agent the outer member provides a swollen zone within the recess of said inner member for anchoring said members together.

3. In a method of uniting two members, the steps of providing dimensionally stable inner and outer tubular members, one of said members being formed of a plastic material capable of permanently swelling upon treatment with a suitable swelling agent into a state of increased volume wherein said member has increased outer dimensions and decreased inner dimensions, providing a bath containing an agent effective to permanently swell said plastic member, inserting said inner member into said outer member, and immersing said members into said bath to permanently swell the plastic member and to anchor said members securely together.

4. The method of claim 3 in which said plastic is cellulose acetate and said swelling agent consists essentially of methyl isobutyl ketone.

5. In a method of forming a tube, the steps of providing an outer tube of plastic capable of permanently swelling into a state of increased volume upon treatment with a swelling agent, providing an inner tube of fibrous stock capable of remaining substantially unaffected upon treatment with an agent capable of swelling the plastic of said outer tube, both of said tubes being finished products that are dimensionally stable without further treatnemt, telescoping said inner tube into said outer tube, providing a bath containing an agent capable of permanently swelling the plastic of said outer tube, and permanently swelling said outer tube to anchor it securely to said inner tube by immersing said telescoped tubes in said bath, whereby, a composite tube is formed from said inner and outer tubes without reducing the external dimensions of said outer tube.

6. The method of claim 5 wherein said inner tube is a resin impregnated paper tube, said outer tube is formed of cellulose acetate, and said swelling agent is methyl isobutyl ketone.

7. The method of claim 5 in which said inner tube is impressed with threads forming recesses in the peripheral surface thereof, and said outer tube swells into said recesses upon treatment with said swelling agent.

References Cited in the file of this patent

UNITED STATES PATENTS

| | | |
|---|---|---|
| 1,707,590 | Winship | Apr. 2, 1929 |
| 1,830,236 | Metz | Nov. 3, 1931 |
| 1,881,915 | Parker | Oct. 11, 1932 |
| 1,998,356 | Brown | Apr. 16, 1935 |
| 2,041,518 | Salz | May 19, 1936 |
| 2,181,035 | White | Nov. 21, 1939 |
| 2,318,950 | Larmour | May 11, 1943 |
| 2,403,734 | Malm et al. | July 9, 1946 |
| 2,565,316 | Lucas et al. | Aug. 21, 1951 |
| 2,577,466 | Jones | Dec. 4, 1951 |
| 2,586,171 | McMahon | Feb. 19, 1952 |
| 2,689,980 | Opavsky | Sept. 28, 1954 |
| 2,706,497 | Shobert | Apr. 19, 1955 |